US007938637B2

(12) United States Patent
Kaully et al.

(10) Patent No.: US 7,938,637 B2
(45) Date of Patent: May 10, 2011

(54) HIGHLY-FILLED, HIGH-VISCOSITY PASTE CHARGE, AND METHOD AND DEVICE FOR PRODUCTION THEREOF

(75) Inventors: Tamar Kaully, Adi (IL); Dganit Shacham, Naharia (IL); Haim Baniste, Naharia (IL); David Tidhar, Kiryat Ata (IL); Corrine Nadiv, Kiryat Ata (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 589 days.

(21) Appl. No.: 11/747,925

(22) Filed: May 14, 2007

(65) Prior Publication Data

US 2008/0040895 A1    Feb. 21, 2008

Related U.S. Application Data

(63) Continuation-in-part of application No. PCT/IL2005/001209, filed on Nov. 16, 2005.

(30) Foreign Application Priority Data

Nov. 16, 2004    (IL) ............................................ 165231

(51) Int. Cl.
*B29D 99/00*    (2010.01)
*B29C 45/14*    (2006.01)

(52) U.S. Cl. ..................... 425/127; 425/129.1; 425/546; 425/812

(58) Field of Classification Search .................. 425/127, 425/129.1, 546, 812; 264/3.1, 3.4
See application file for complete search history.

(56) References Cited

U.S. PATENT DOCUMENTS

| 3,027,597 | A | * | 4/1962 | Mccurdy | ........................ 264/3.1 |
| 3,311,678 | A | * | 3/1967 | Brock et al. | ..................... 264/3.1 |
| 3,960,993 | A | * | 6/1976 | Johnson et al. | ................. 264/3.3 |
| 4,555,277 | A | | 11/1985 | Scribner | |
| 4,793,955 | A | * | 12/1988 | Poulter et al. | .................. 264/3.3 |
| 5,387,095 | A | | 2/1995 | Mahoney et al. | |
| 6,117,212 | A | | 9/2000 | Buechele et al. | |

OTHER PUBLICATIONS

Israeli application 165231 filed Nov. 16, 2004.*

* cited by examiner

*Primary Examiner* — Robert B Davis
(74) *Attorney, Agent, or Firm* — Mark M. Friedman

(57) ABSTRACT

A highly-filled paste, and a method and device of de-aerating and injecting the paste, the paste including: (a) a solid filler; (b) an organic binder, and (c) a residual gas, wherein the paste contains at least 80 volume-% of the solid filler and has a viscosity exceeding 100 kilopascal·seconds, wherein the filler, binder, and residual gas are intimately mixed so as to form a substantially homogeneous paste, and wherein a composition of the solid filler, binder, and residual gas is selected such that the homogeneous paste has: an average density greater than 98.5% of a Theoretical Maximum Density (TMD).

18 Claims, 5 Drawing Sheets

HIGHLY-FILLED, HIGH-VISCOSITY PASTE CHARGE, AND METHOD AND DEVICE FOR PRODUCTION THEREOF

This continuation-in-part (CIP) application draws priority from PCT/IL2005/001209, filed Nov. 16, 2005, which draws priority from Israel Patent Application No. 165231, filed Nov. 16, 2004.

FIELD AND BACKGROUND OF THE INVENTION

The present invention relates to highly-filled homogeneous high-viscosity pastes, and to a device for, and method of, de-aerating and injecting such highly-filled pastes, particularly for the fabrication of explosive devices such as hollow charge munitions, linear charges, and magnetic generators.

Shaped charges are traditionally manufactured from pressed plastic bonded explosives (PBX). The pressing technology has profound advantages, mainly, high solid content, which is associated with the high energy of the shaped charge, and homogeneity, which is associated with the precision of the shaped charge. Nevertheless, pressed charges have also some profound drawbacks: poor mechanical properties, relatively high vulnerability, and high cost due to the requisite machining.

The performance of highly-filled explosive devices is strongly dependent on the geometry and homogeneity of the device. Another important factor in determining the performance and sensitivity of an explosive device is the relative density measured by the percent of the theoretical maximum density (TMD) of the explosive composition. The TMD of a blended composition is determined by the specific gravities and by the relative proportions in which the ingredients are present.

The actual measured value of the composition density, on average, is always lower than, but may closely approach, the TMD. With modern mixing techniques and vacuum equipment, the actual density of an explosive composition can approach 98-99% or more of the composition's theoretical density, provided that the mixture is a low-viscosity mixture (i.e., below 50, and typically, below 20 KPa·seconds).

By sharp contrast, in highly-filled pastes, the high-viscosity (above 100 KPa·seconds, and especially above 500-1000 KPa·seconds) of the paste makes the residual air (entrapped during mixing and transport operations), extremely difficult to remove. For such pastes, there is a significant difference between the actual density and the TMD. The presence of entrapped air must be minimized before the material is injected in order to avoid undesired air pockets in the injected products.

It must be emphasized that increasing the relative density (i.e., the percent of the TMD) of an explosive composition is highly desirable because even small increases in the relative density significantly increase the explosive "punch"—specifically, higher velocity of detonation (VOD) and increased penetration performance.

Homogeneity is also of cardinal importance in determining explosive composition performance. Homogeneity is dramatically influenced by local concentrations of residual air or gas, but is also influenced by local concentrations of binder (or other additives to the explosive powder), which often have specific gravities that are substantially different from that of the explosive powder.

Over the last two decades, attempts have been made to develop highly-filled, extrusion-molded or injection-molded energetic PBX for various applications. Addressing the problems associated with entrapped air is U.S. Pat. No. 4,555,277 to Scribner, entitled "Extrusion Cast Explosive", which teaches a viscous mixture that is transferred within the system under a pressure exceeding atmospheric pressure. The use of viscous mixtures under pressure-deaeration enables a high solids loading of fine crystalline explosive.

It is further disclosed that specialized equipment needed to be developed for deaerating the mixture and for extrusion-casting the mixture to the desired shape. The equipment consists of a long, vertical, hollow cylinder with two hydraulic pistons operating from either end. Separating the two pistons is an orifice plate, below which are located vacuum and discharge ports. The mold or device for filling is connected to discharge port.

The mixed paste is placed in the upper chamber and the entire system is evacuated. The paste is forced through the orifice plate and thoroughly deaerated. The vacuum port is closed and, without breaking the vacuum, the material is forced into the mold while the mold is evacuated. Low pressure hydraulic cylinders that develop only 700-1400 Kpa are used.

The maximum filler content achieved by U.S. Pat. No. 4,555,277 to Scribner is 75.9 weight percent, which corresponds, after taking into account the specific gravity of each component, to only about 62 volume percent. It would be highly advantageous to have pastes having significantly higher filler contents.

U.S. Pat. No. 5,387,095 to Mahoney, et. al, entitled "Apparatus for Injection Molding High-Viscosity Materials", discloses an apparatus for injection molding highly viscous materials in which incoming high-viscosity material flows through a supply conduit and is divided into strands by splitter plates as it flows into an evacuated chamber and is degassed. When the chamber is full, the supply of high-viscosity material is interrupted and the chamber is rotated to an injecting station while another chamber swings to the degassing station for filling. At the injecting station, a piston is lowered to engage the high-viscosity material in the first chamber, and a mold table is rotated to register a mold with a vacuum shroud and the mold is lifted into the shroud. The piston is further lowered in controlled increments to inject a quantity of high-viscosity material sufficient to fill a mold.

It is further disclosed by U.S. Pat. No. 5,387,095 that the flow passages for the high-viscosity material (at least about 8 kilopoise or 0.8 KPa·seconds) require a minimum orifice diameter of at least about 0.5 inch, in order to avoid flow stagnation and clogging of the high-viscosity material.

An explosive simulant disclosed by U.S. Pat. No. 5,387,095 to Mahoney, et. al, has a filler content of 90%, by weight. The stimulant consists of glass beads (90%) and polyurethane binder (10%), which is an idealization with respect to real fillers having particles with edges, coarse surfaces, etc. Even so, this explosive stimulant contains only 76 volume percent of the glass bead filler. Moreover, no information about the relative density (percent of TMD) of the paste is provided, nor measurements of paste homogeneity. However, given that the bead has a diameter of at least 0.5 inch, the deaeration is necessarily unsatisfactory for highly-filled pastes used in various high-performance applications.

It must be appreciated that improvements in filler content, even small improvements often result in appreciable increases in performance. It must be further appreciated that from a technological standpoint, such small improvements in filler content are extremely difficult to achieve. One reason behind this can be understood from FIG. 1, which graphically depicts, for a typical paste, the change in viscosity as a function of filler content (in volume percent). Up to a filler content of about 66%, the viscosity is almost constant, i.e., substantially insensitive to increased filler content. Above 66%, however, the viscosity rises rapidly. In terms of measured points: at a "baseline" filler content of 62.5 volume-%, the viscosity is 64.1 pascal·seconds (Pa·s). At a filler content of 67.5 volume-%, the viscosity is 297 Pa·s, which corresponds to an increase by a factor of 4.6 with respect to the baseline value. At a filler content of 70 volume-%, the viscosity is 2690 Pa·s, which corresponds to a 42-fold increase with respect to the baseline value. Moreover, the small increase in volume-% of filler from 67.5 volume-% to 70 volume-% results in a nine-fold increase in the viscosity. Such significant, sharp increases in viscosity have a profound effect on the flow properties of the paste, and introduce new hurdles with respect to the relative density and the homogeneity of the paste.

Thus, while it is often of great advantage to have more highly-filled, high-viscosity, homogeneous pastes, than those known heretofore, there is no device for, and method of, effectively eliminating occluded air in such paste and delivering the paste into a container, while maintaining homogeneity of the filler and binder materials within the paste.

There is therefore a recognized need for, and it would be highly advantageous to have, a device for, and method of, de-aerating and injecting high-viscosity pastes, and, particularly, for de-aerating and injecting high-viscosity pastes for use in the fabrication of munitions. It would be of further advantage for such a method and device to function in a simple, inexpensive and robust fashion so as to improve the power, range, precision and efficiency of the munitions.

SUMMARY OF THE INVENTION

The present invention is a homogeneous high-viscosity paste, and a method and device of de-aerating and injecting the paste. The present invention is particularly suitable for the fabrication of explosive devices such as hollow charge munitions and munitions with special geometries.

According to the teachings of the present invention there is provided a highly-filled paste including: (a) a solid filler; (b) an organic binder, and (c) a residual gas, wherein the paste contains at least 80 volume-% of the solid filler, and wherein the filler, binder, and residual gas are intimately mixed so as to form a substantially homogeneous paste having a viscosity exceeding 100 KPa·seconds, and wherein a composition of the solid filler, binder, and residual gas is selected such that the homogeneous paste has an average density greater than 98.5% of a Theoretical Maximum Density (TMD).

According to further features in the described preferred embodiments, the composition of the solid filler, binder, and residual gas is further selected such that the homogeneous paste has: a ratio of a local density to the average density that is restricted within a range of 0.990 to 1.010, throughout the paste.

According to still further features in the described preferred embodiments, the solid filler includes an explosive compound.

According to still further features in the described preferred embodiments, the content of the residual gas is restricted such that the density is greater than 99.0% of the TMD.

According to still further features in the described preferred embodiments, the content of the residual gas is restricted such that the density is greater than 99.2% of the TMD.

According to still further features in the described preferred embodiments, the ratio of local density to average density is restricted within a range of 0.995 to 1.005, throughout the paste.

According to still further features in the described preferred embodiments, the ratio of local density to average density is restricted within a range of 0.997 to 1.003, throughout the paste.

According to still further features in the described preferred embodiments, the composition is selected such that the viscosity exceeds 200 KPa·seconds, and the content of the residual gas is restricted such that the density is greater than 99.0% of the TMD.

According to still further features in the described preferred embodiments, the composition is selected such that the viscosity exceeds 500 KPa·seconds. More typically, the composition is selected such that the viscosity exceeds 1000 KPa·seconds and even 1500 KPa·seconds.

According to still further features in the described preferred embodiments, the ratio of local density to average density is restricted within a range of 0.995 to 1.005, throughout the paste.

According to still further features in the described preferred embodiments, the explosive compound includes RDX and/or HMX.

According to still further features in the described preferred embodiments, the content of the residual gas is restricted such that the density exceeds 99.5% of the TMD, preferably exceeds 99.7% of the TMD, and most preferably exceeds 99.5% of the TMD.

According to still further features in the described preferred embodiments, the content of the residual gas is restricted such that the density is greater than 99.7% of the TMD.

According to still further features in the described preferred embodiments, the highly-filled paste contains at least 82 volume-% of the solid filler.

According to still further features in the described preferred embodiments, the highly-filled paste contains at least 84 volume-% of the solid filler.

According to still further features in the described preferred embodiments, the highly-filled paste contains at least 86 volume-% of the solid filler.

According to still further features in the described preferred embodiments, the highly-filled paste contains at least 82 volume-% of the solid filler and has a viscosity of at least 500 KPa·seconds, the content of the residual gas is restricted such that the density is greater than 99.5% of the TMD, and the ratio of local density to average density is restricted within a range of 0.995 to 1.005, throughout the paste.

According to another aspect of the present invention there is provided a device for de-aerating a highly-filled, high-viscosity paste, the device including: (a) a housing having: (i) a chamber, the chamber having a feed opening for receiving a highly-filled paste having a viscosity exceeding 100 KPa·seconds; and (ii) a piston for urging the paste within a specified path within the chamber; (b) a splitting element disposed within the path of the piston, such that the urging by the piston in a presence of the splitting element effects a splitting of the highly-filled paste into a plurality of paste streams, so as to increase a surface area of the high-viscosity paste by a factor of at least 200, and (c) a vacuum aperture fluidly associated with the housing, for operatively connecting to a vacuum system for de-aeration of the paste streams, so as to produce a de-aerated paste.

According to further features in the described preferred embodiments, the piston is designed and configured to deliver an urging pressure exceeding 20 atmospheres.

According to still further features in the described preferred embodiments, the splitting element is designed and configured to increase the surface area by a factor of at least 1000.

According to still further features in the described preferred embodiments, the splitting element is designed and configured to increase the surface area by a factor of at least 2500.

According to still further features in the described preferred embodiments, the splitting element is designed and configured to increase the surface area by a factor of at least 5000.

According to still further features in the described preferred embodiments, the splitting element has a plurality of openings for splitting the highly-filled paste, each of the openings having a cross-sectional area of less than 0.2 cm$^2$.

According to still further features in the described preferred embodiments, each of the openings has a cross-sectional area of less than 0.12 cm$^2$.

According to still further features in the described preferred embodiments, each of the openings has a cross-sectional area of less than 0.10 cm$^2$.

According to still further features in the described preferred embodiments, each of the openings has a cross-sectional area of less than 0.08 cm$^2$.

According to still further features in the described preferred embodiments, the device further includes: (d) at least one discharge opening disposed in the housing, for discharging the de-aerated paste into an explosive device.

According to still further features in the described preferred embodiments, the device further includes: (e) an interface assembly, connected to the housing and for connecting to a loading apparatus, the loading apparatus for containing the explosive device.

According to still further features in the described preferred embodiments, the device further includes: (d) a loading apparatus designed and configured to have a chargeless shaped-charge (e.g., hollow-charge) munition loaded therein, and (e) a second chamber associated with the housing, for receiving the de-aerated paste from the first chamber, the second chamber for fluid communication, via a paste discharge opening, with the shaped-charge munition.

According to still further features in the described preferred embodiments, the device further includes: (f) a second piston, disposed within the second chamber, for injecting the de-aerated paste from the second chamber into the hollow-charge munition.

According to still further features in the described preferred embodiments, the device further includes: (f) a holding mechanism, associated with the loading apparatus, for securely fixing in place a wave shaper of the hollow charge munition.

According to still further features in the described preferred embodiments, the device further includes: (g) a protective cover for shielding the holding mechanism during a high-pressure injection of the de-aerated paste into the hollow charge munition.

According to still further features in the described preferred embodiments, the loading apparatus includes: (i) a vacuum aperture, disposed in the housing, for operatively connecting to a vacuum system for de-aeration of the paste streams during loading of the paste into the hollow charge munition.

According to still further features in the described preferred embodiments, the loading apparatus includes: (i) a supporting element for supporting a liner in the hollow-charge munition, the supporting element designed to support the liner against a pressure of at least 20 atmospheres.

According to still further features in the described preferred embodiments, the liner has a substantially conical contour, and the contour of the supporting element substantially matches the contour of the liner.

According to still further features in the described preferred embodiments, the holding mechanism includes at least one threaded bolt for attaching the loading apparatus to the wave shaper.

According to yet another aspect of the present invention there is provided a method of de-aerating a high-viscosity paste, the method including the steps of: (a) providing a device including: (i) a chamber having a feed opening for receiving a highly-filled paste feed material having a viscosity exceeding 100 KPa·seconds; (ii) an urging mechanism for urging the feed material within a specified path within the chamber, and (iii) a splitting element disposed within the path of the mechanism; (b) urging the high-viscosity paste towards the splitting element, using the mechanism, so as to split the feed material into a plurality of paste streams, thereby increasing a surface area of the feed material by a factor of at least 200, and (c) de-aerating the plurality of paste streams to produce a de-aerated, high-viscosity paste.

According to still further features in the described preferred embodiments, the de-aerated high-viscosity paste includes: (i) an explosive solid filler; (ii) a binder, and (iii) a residual gas, wherein the de-aerated high-viscosity paste contains at least 80 volume % of the solid filler, and wherein the de-aerated high-viscosity paste has an average density greater than 98.5% of a Theoretical Maximum Density (TMD).

According to still further features in the described preferred embodiments, the urging is performed by the urging mechanism, at a pressure exceeding 30 atmospheres (absolute).

According to still further features in the described preferred embodiments, the method further includes the steps of: (d) attaching the device to a loading apparatus containing a chargeless shaped-charge munition, and (e) performing a high-pressure injection the de-aerated, high-viscosity paste, the high-pressure injection taking place at a pressure of at least 20 atmospheres (absolute), from the device, into the shaped-charge munition.

According to still further features in the described preferred embodiments, the method further includes the step of: (f) applying a vacuum to a volume of the shaped-charge munition so as to de-aerate the volume.

According to still further features in the described preferred embodiments, the method further includes the step of: (f) supporting a liner of the hollow-charge munition during the high-pressure injection.

According to still further features in the described preferred embodiments, the method further includes the step of: (f) securely fixing in place, a wave shaper of the hollow charge munition, during the high-pressure injection.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
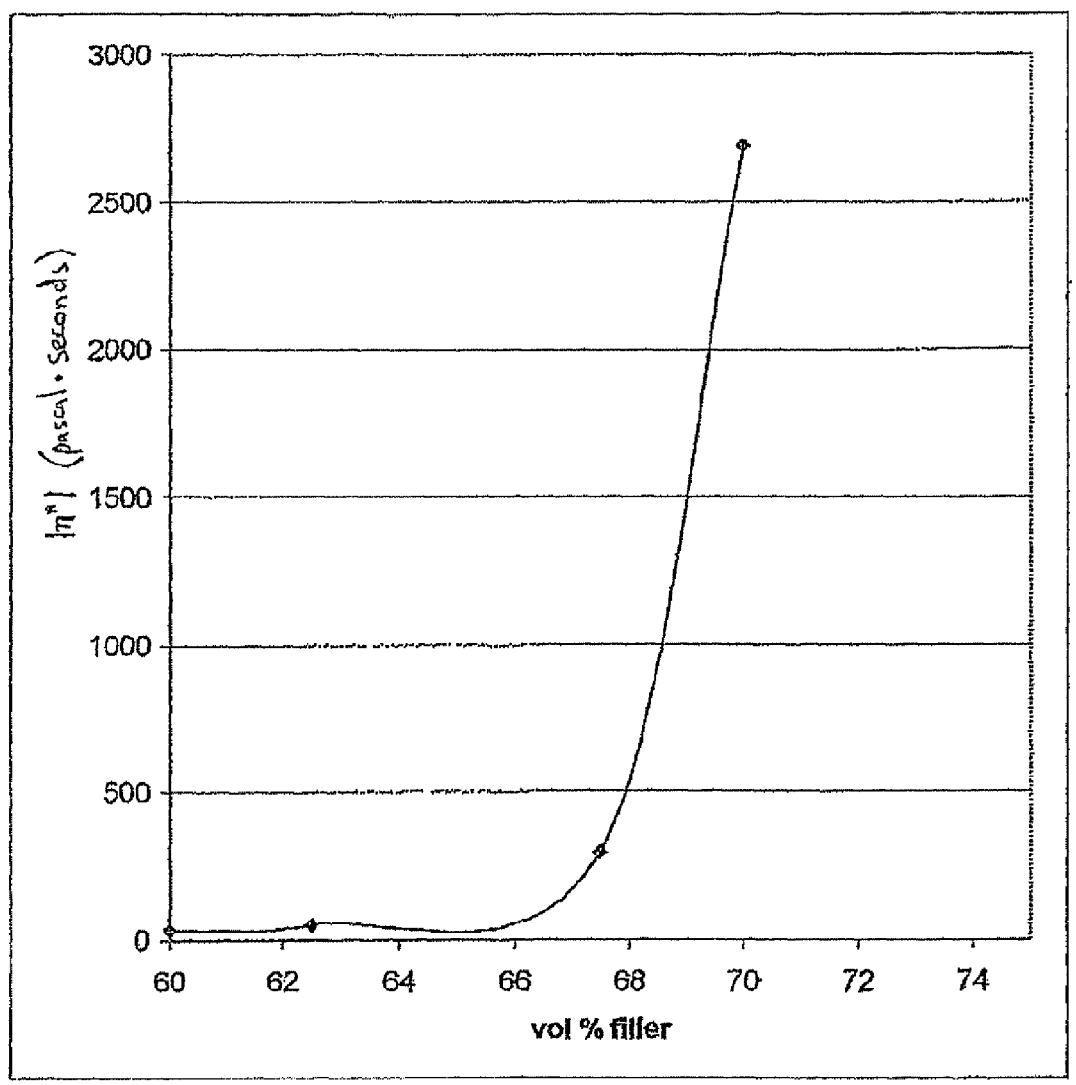
FIG. 1 is an exemplary graph depicting the change in viscosity as a function of filler content (in volume percent), for a typical explosive paste.

The present invention is a highly-filled, homogeneous paste, and a method and device of de-aerating and injecting the paste. The present invention is particularly suitable for the fabrication of explosive devices such as hollow charge munitions.

The principles and operation of the device and method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Figure 2:
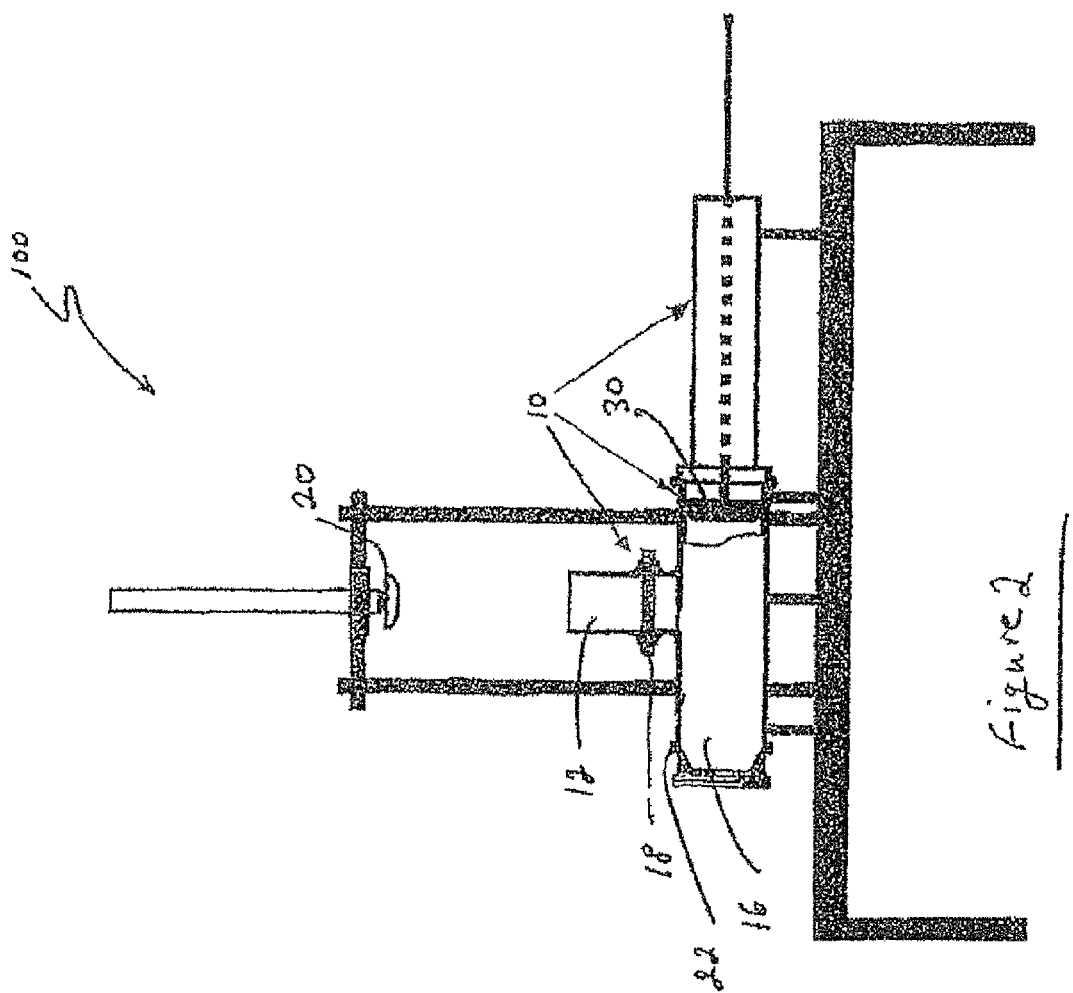
FIG. 2 is a side, partially cut-open view of a device for de-aerating a high-viscosity paste, and for delivering the de-aerated paste into a hollow-charge munition, in accordance with the present invention.
Figure 3:
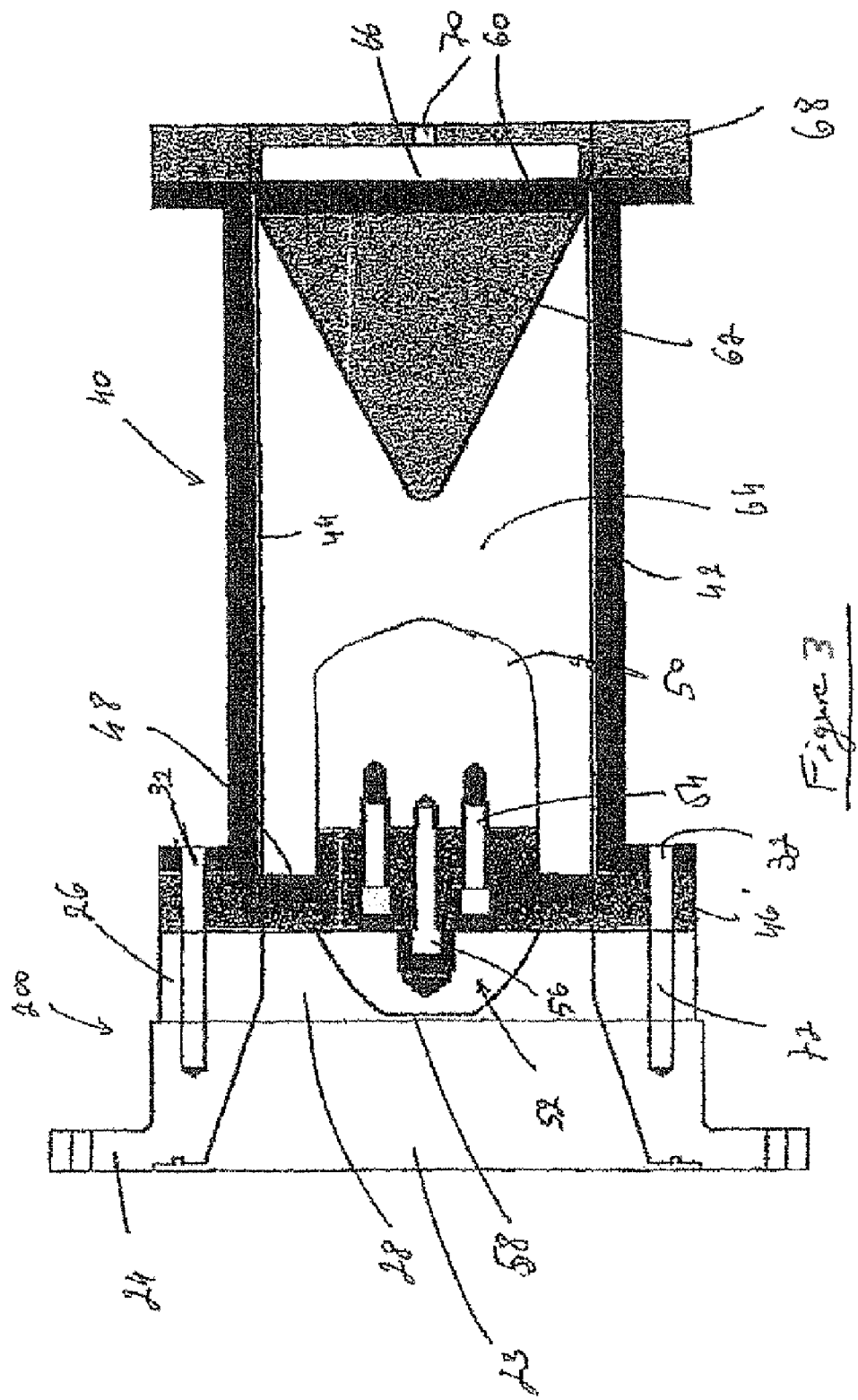
FIG. 3 is a side, cut-open view of a hollow-charge munition attached to the device of FIG. 2.

Referring now to the drawings, FIG. 2 is a side, cut-open view of a device for de-aerating a high-viscosity paste, and for delivering the de-aerated paste into a hollow-charge munition, and FIG. 3 is a side, cut-open view of a hollow-charge munition attached to the device of FIG. 2.

In FIG. 2, device 100 includes a housing 10 having a first chamber 12, typically cylindrical and oriented in a vertical fashion, for accepting the feed material, which is a high-viscosity paste containing a high concentration of residual air or gas. Typically, the feed material includes an explosive powder and a binder that have been intimately mixed in a high-shear mixer. The mixer may or may not be equipped with a vacuum/de-aeration unit.

Preferably, a feeding element (not shown in the drawing), associated with chamber 12, is used to feed the paste into first chamber 12. The feeding element may be a piston, a forcing screw conveyor, or other suitable feeding arrangements known in the art.

A splitting element 18 is disposed within first chamber 12. Splitting element 18 may be a grid, or any other device capable of splitting the paste into many paste streams so as to increase the surface area of the paste by a factor of at least 100, preferably by factor of at least 1000, more preferably by a factor of at least 2500, and most preferably by a factor of at least 5000. A first piston 20 is aligned with first chamber 12 such that the movement of first piston 20 along a longitudinal axis of first chamber 12 urges the high-viscosity paste through the openings in splitting element 18 and into second chamber 16. In the process, the high-viscosity paste is split by splitting element 18 into fine paste streams or strings resembling long, thin macaroni noodles.

The urging pressure of first piston 20 depends, inter alia, on the viscosity and other characteristics of the paste. The pressure delivered by first piston 20 should be at least 10 atmospheres (absolute), more preferably, at least 20 atmospheres, and most preferably, at least about 40 atmospheres.

Housing 10 further includes a second chamber 16, typically cylindrical and oriented in a perpendicular fashion with respect to first chamber 12, for receiving the paste from first chamber 12. The gas occluded in the high surface area paste is drawn out of the system by a vacuum system (not shown), via vacuum aperture 22. It will be appreciated by one skilled in the art that various positions are possible for vacuum aperture 22, as long as fluid communication can be maintained between vacuum aperture 22 and second chamber 16.

A second piston 30, disposed within housing 10, is aligned with second chamber 16 such that the movement of second piston 30 along a longitudinal axis of second chamber 16 urges the high-viscosity paste out of second chamber 16 and into a hollow-charge munition as will be described hereinbelow with reference to FIG. 3.

FIG. 3 describes a preferred embodiment in which an end 24 of second chamber 16 (shown in FIG. 2) is attached to an interface assembly 200 for interfacing between a hollow-charge munition loading apparatus 40 and device 100, so as to allow the insertion of high-viscosity paste charges into loading apparatus 40. End 24, which is typically a flange, is attached to loading apparatus 40 via by fitting bolts 32, with interface assembly 200 being sandwiched between loading apparatus 40 and end 24.

Hollow-charge munition loading apparatus 40 is broadly defined by a (preferably metallic) longitudinal support casing 42, which is generally cylindrical. Immediately within support casing 42 is sleeve 44, a thin, generally cylindrical lining preferably made of, but not limited to, a thermoplastic material having a high-impact strength, such as polycarbonate (e.g., Lexan®). Casing 42 is connected to a metallic first sidewall 46, located at the first end of loading apparatus 40. First sidewall 46 has at least one, and preferably three or more injection openings 48 for injecting a paste charge 64 into loading apparatus 40.

A thin, metallic, substantially conical liner 62, typically made of copper, is connected to sleeve 44, such that the head of the cone faces the first end of loading apparatus 40, the base of the cone having a diameter approaching that of sleeve 44. Sleeve 44, along with liner 62, serve as a housing for a hollow-charge munition that includes tightly-packed paste charge 64 and a wave shaper 50. Wave shaper 50 is shaped according to shapes known in the art for wave shapers.

Interface assembly 200 includes a wave shaper holder 52 designed to hold wave shaper 50 in place during the injection of high-viscosity paste charge 64 into the volume defined by sleeve 44, and via first sidewall 46. As exact positioning of wave shaper 50 is critical for ensuring the range, efficiency and accuracy of a hollow-charge munition, wave shaper holder 52 is designed to provide a firm and exact connection between wave shaper 50 and first sidewall 46.

Wave shaper holder 52 includes bolts 54, tightly bolted from the outer side of loading apparatus 40, through first sidewall 46, and into wave shaper 50. One of these bolts 54, preferably centrally bolted, has a threaded-protruding head 56 for screwing a protective cover 58 on to first sidewall 46. Protective cover 58 serves to cover and protect bolts 54, such that paste does not get caught by the bolts and the recesses, etc. associated therewith. The width of interface assembly 200 is designed to be compatible (i.e., exceed) the width of protective cover 58.

Directly opposite first sidewall 46, loading apparatus 40 has a second sidewall 60, associated with casing 42. Liner 62—a thin and relatively fragile element—is supported by a conical supporting element 66, second sidewall 60, and a backing cover 68 (typically a flange), during the high-pressure introduction of paste charge 64. Backing cover 68 preferably has a vacuum outlet 70 operatively connected to a vacuum system (not shown) for de-aeration of loading apparatus 40 during the introduction of paste charge 64.

When the paste is discharged from end 24 of device 100, the paste is introduced to interface assembly 200 via first opening 23. As wave shaper holder 52 is disposed about the central of the longitudinal axis of interface assembly 200 and loading apparatus 40, the passageway for transfer of the paste is transformed into a substantially annular opening 28, which fluidly communicates with openings 48 protruding into loading apparatus 40.

Thus, as second piston 30 (see FIG. 2) is driven towards interface assembly 200, de-aerated paste is introduced via first opening 23, through annular opening 28, and openings 48, into loading apparatus 40. The high pressure developed by second piston 30, preferably coupled with the vacuum developed via vacuum outlet 70, serve to tightly pack the volume defined by sleeve 44 and liner 62 with paste charge 64, and ensure that the resultant hollow charge munition is substantially de-aerated, even in the corners of the volume.

After the high-pressure injection of paste charge 64 has concluded, supporting element 66 is dismantled from loading apparatus 40. Fitting bolts 32 and loading apparatus 40 are separated from interface assembly 200, such that the hollow charge munition, defined by sleeve 44 and liner 62, including wave shaper 50, and tightly packed with de-aerated, homogeneous paste charge 64, is now ready for removing from loading apparatus 40, and for subsequent packing and storage.

The urging pressure of second piston 20 depends, inter alia, on the viscosity and other characteristics of the paste. Generally, the pressure delivered by second piston 20 should be at least 10 atmospheres (absolute), more preferably, at least 30 atmospheres, and most preferably, at least about 60 atmospheres.

It must be emphasized that the closest prior art, U.S. Pat. No. 5,387,095, teaches that in injection molding of highly filled materials, the use of excessive driving forces on the material produces shear stresses in the material that are so high that the filler separates from the binder and thereby produces binder-rich, defective products.

It is further disclosed by U.S. Pat. No. 5,387,095 that the flow passages for the high-viscosity material (at least about 8 kilopoise) require a minimum orifice diameter of at least about 0.5 inch (corresponding to a cross-sectional area of 1.27 cm$^2$), in order to avoid flow stagnation and clogging of the high-viscosity material.

It has surprisingly been discovered by the present inventors that in sharp contrast to the most relevant prior art, the use of extremely-fine orifices coupled with extremely high-pressure splitting, yields a free-flowing process for highly-filled pastes, and also enables significantly-improved deaeration. Moreover, under these conditions, no separation of filler and binder is observed, such that the resultant paste is extremely homogeneous, both with respect to residual air concentration and with regard to local concentrations of filler and binder.

The orifices or openings in splitting element 18, according to the present invention, have a characteristic cross-sectional area that is below 0.2 cm$^2$, preferably below 0.1 cm$^2$, and most preferably below about 0.07 cm$^2$.

In sharp contrast to the most relevant prior art, the use of powerful driving forces on the paste material has been found to be of significant advantage. Preferably, the pressure delivered by pistons 10 and 20 should be at least 30 atmospheres and more preferably, at least about 40 atmospheres.

Elongated charges containing highly-filled pastes of the present invention are desirable for different applications. Elongated charges differ from other charges in various ways. Characteristically, elongated charges have a high length to diameter ratio.

Such charges are difficult to fill in a homogeneous way with highly-filled pastes, due to their very high viscosity. The flowability of such highly-filled pastes is extremely poor, and the elongated shape further magnifies this problem.

Using the inventive technology, however, elongated charges can be produced in which the length to diameter (L/D) ratio is at least 10 to 1, and often at least 20 to 1 or even at least 200 to 1. The diameter may be as small as 40 mm, and successful filling of elongated charges having a diameter of less than 12 mm and even down to 3 mm has been achieved.

Figure 3A:
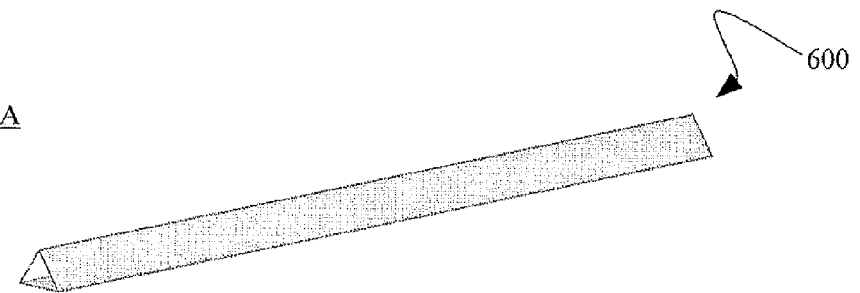
FIGS. 3A-3C are schematic side views of elongated charges containing high-viscosity paste, according to the present invention, in which the charges have round or polygonal-shaped cross sections.
Figure 3B:
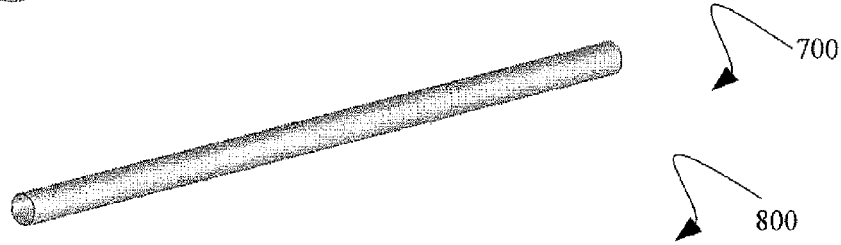
Figure 3C:
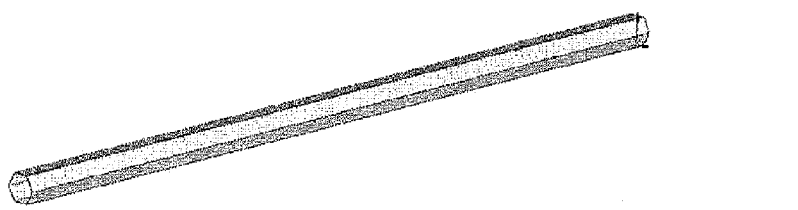

FIGS. 3A-3C are schematic side views of elongated charges containing highly-filled pastes of the present invention, in which the charge cross-section is of a particular geometry. The cross-section of elongated shaped charge may be, by way of example, a substantially round cross-section 600 (FIG. 3A), a substantially triangular cross-section 700 (FIG. 3B), or a substantially hexagonal cross-section 800 (FIG. 3C). It will be apparent to one skilled in the art that elongated charges having other cross-sections, including polygonal cross-sections, may also be used.

Figure 3D:
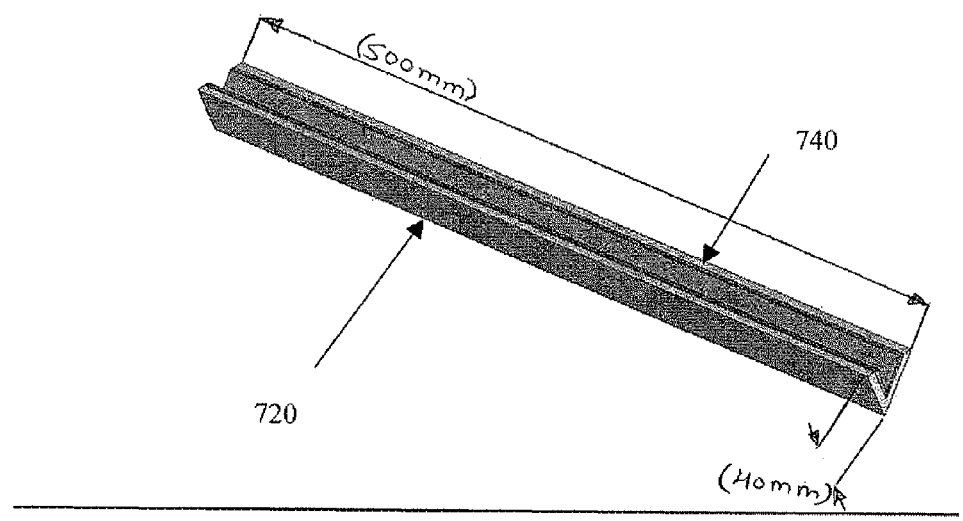
FIG. 3D is a schematic cut-open view of the elongated charge of FIG. 3B.

FIG. 3D is a schematic cut-open view of the elongated charge provided in FIG. 3B, showing an external, preferably steel mold 720 and a liner 740 disposed on an inner surface of mold 720.

Figure 4:
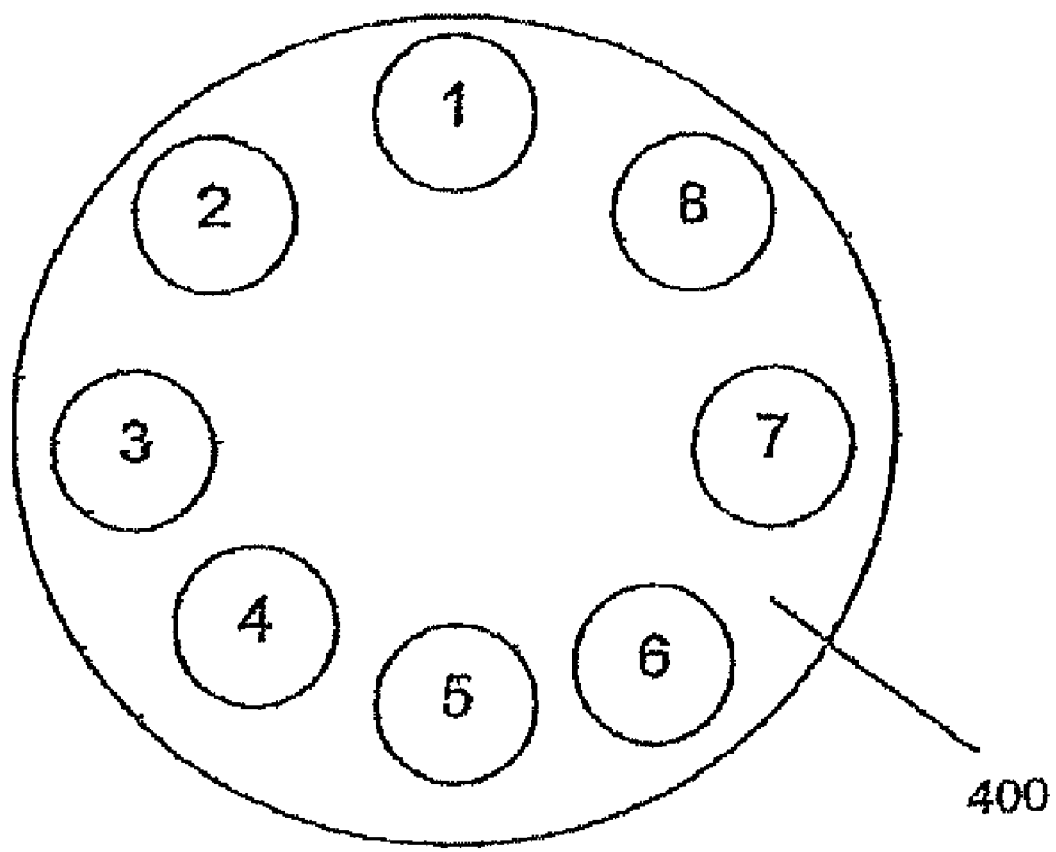
FIG. 4 is a schematic representation of sampling of a tomogram for determining local differences in specific gravity.

FIG. 4 is a schematic representation of sampling of a tomogram 400 for determining local differences in specific gravity. The cross-section used in each tomogram is taken from a roll of the inventive paste charge, the roll having a diameter of 135 min. Within the two-dimensional tomographic image, 8 circular regions (marked 1-8), distributed in a substantially even manner around the circumference, are selected. Each circular region has a diameter of 25 nm. The shading within a particular region on the tomogram provides an extremely precise value for the specific gravity of the material within that region. This procedure is repeated for at least three cross-sections distributed along the length of the roll.

In paste charges produced in accordance with the present invention, the difference in specific gravity between the 24 (3×8) samples was a maximum of 0.002 grams/cm$^3$. In other words, the ratio of local density to average density in all 24 samples was between 0.999 and 1.001.

EXAMPLES

Reference is now made to the following examples, which together with the above descriptions, illustrate the invention in a non-limiting fashion.

Example 1

An energetic, highly-filled paste containing HMX was prepared by high-shear mixing under vacuum, followed by splitting, deaeration and loading under high pressure (splitting pressure of 40 atmospheres, loading pressure of 60 atmospheres). The splitting, deaeration, and loading were performed substantially as described hereinabove.

The composition of the energetic paste was as follows:
82 vol-% HMX
18 vol-% binder, including polydimethyl siloxane and a plasticizer.

The viscosity of the paste was about 2000 KPa·sec.

A TMD in excess of 99.5% was achieved. The homogeneity, as determined from 3 tomograms (8 sampling areas within each tomogram), each representing a slice of the inventive paste charge, was ±0.001 grams/cm$^3$.

Example 2

An energetic, highly-filled paste containing HMX was prepared by high-shear mixing under vacuum, followed by splitting, deaeration and loading under high pressure (splitting pressure of 40 atmospheres, loading pressure of 60 atmospheres). The splitting, deaeration, and loading were performed substantially as described hereinabove.

The composition of the energetic paste was as follows:
87 volume-% HMX
13 volume-% binder, including HTPB, plasticizer, and surfactant.

The viscosity of the paste was about 7,000 KPa·sec.

A TMD in excess of 99.7% was achieved. The homogeneity, as determined from 3 tomograms, each representing a slice of the inventive paste charge, was ±0.001 grams/cm$^3$.

The present invention overcomes several technological hurdles in providing a shaped-charge munition containing a high-viscosity paste in which the average density approaches the Theoretical Maximum Density (TMD), and in which the ratio of local density to average density (a measure of homogeneity) is substantially uniform throughout the paste. These hurdles include:

- effective de-aeration of the paste by subjecting to vacuum after increasing the surface area by a factor of at least 200, and preferably, by a factor of at least 2000;
- maintaining/augmenting the de-aerated state of the paste by subjecting the paste to vacuum during the loading of the paste into a shaped mold;
- avoiding separation of filler and binder during splitting and transport operations;
- precise and robust placement of the wave shaper (or other inner parts of the munition) during the high-pressure injection of the paste;
- support of the liner and sleeve during the high-pressure injection;
- a device and method for feeding the paste through a splitting element prior to de-aeration, such that stagnant zones and blockages are avoided, and
- an interface assembly for connecting between the housing of the device and the shaped-charge munition, so as to enable a delivery of the high-viscosity, de-aerated paste into the munition, under high pressure.

As used herein in the specification and in the claims section that follows, the terms "residual gas" and "occluded gas" refer to relatively minute quantities of gas or gases, including air, disposed in a paste, and/or to a pocket of gas or air disposed between a paste and a sleeve, wall, or liner of a munition.

As used herein in the specification and in the claims section that follows, the term "binder" refers to a flowable material for binding to a solid material or powder, and is specifically meant to include a thermosetting resin, or a mixture of a thermosetting resin with a plasticizer and/or surface active agent.

As used herein in the specification and in the claims section that follows, the terms "paste charge" or "explosive paste", with respect to formulations and the like, refer to high-viscosity paste formulations and are specifically meant to exclude poured and pressed formulations.

As used herein in the specification and in the claims section that follows, the term "high-viscosity", with respect to a paste, refers to a viscosity exceeding 100 KPa·seconds (kilopascal·seconds), typically, at least 500 KPa·seconds, and often, at least 1000 KPa·seconds, or even 1500 KPa·seconds. To date, high-viscosity pastes having a viscosity of at least about 2000 KPa·seconds to at least 7000 KPa·seconds have been successfully used to fill shaped charges, such that the charges had a TMD of at least 99.5% of the theoretical TMD (see, by way of example, Examples 1 and 2).

As used herein in the specification and in the claims section that follows, the term "piston", used generically, refers to a mechanism that creates pressure on the paste for transferring the paste from one area to another, such as a mechanical piston, or a forcing screw conveyor. The term "mechanical piston" refers specifically to a conventional piston.

As used herein in the specification and in the claims section that follows, the term "throughout the paste" and the like refers to a level of homogeneity in samples of the high-viscosity paste, as determined by sampling of a paste roll having a diameter of at least 135 mm, according to the following procedure: at least 3 cross-section samples, well-distributed along the length of the paste roll, are taken, and a tomogram is produced from each cross-section sample. Within the two-dimensional tomographic image, 8 circular regions, distributed in a substantially even manner around the circumference, are selected. Each circular region has a diameter of 25 nm. From the shading within each particular circular region, an extremely precise value for the specific gravity of the material within that region is then determined.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was individually indicated to be incorporated herein by reference. Specifically incorporated by reference for all purposes as if fully set forth herein are U.S. Pat. Nos. 4,555,277, 5,387,095, and 6,669,122. In addition, citation or identification of any reference in this application shall not be construed as an admission that such reference is available as prior art to the present invention.

What is claimed is:

1. A device for de-aerating a highly-filled, high-viscosity paste, the device comprising:
   (a) a housing having:
      (i) a chamber, said chamber having a feed opening for receiving a highly-filled paste having a viscosity exceeding 100 kilopascal·seconds; and
      (ii) a piston for urging the paste within a specified path within said chamber;
   (b) a splitting element disposed within said path of said piston, such that said urging by said piston in a presence of said splitting element effects a splitting of said highly-filled paste into a plurality of paste streams, so as to increase a surface area of the high-viscosity paste by a factor of at least 200, said splitting element having a plurality of openings for splitting said highly-filled paste, each of said openings having a cross-sectional area of less than 0.2 cm$^2$; and
   (c) a vacuum aperture fluidly associated with said housing, for operatively connecting to a vacuum system for de-aeration of said paste streams, so as to produce a de-aerated paste.

2. The device of claim 1, wherein said piston is designed and configured to deliver a pressure exceeding 20 atmospheres, for said urging.

3. The device of claim 1, wherein said splitting element is designed and configured to increase said surface area by a factor of at least 1000.

4. The device of claim 1, wherein said splitting element is designed and configured to increase said surface area by a factor of at least 2500.

5. The device of claim 1, wherein said splitting element is designed and configured to increase said surface area by a factor of at least 5000.

6. The device of claim 1, wherein each of said openings has a cross-sectional area of less than 0.12 cm$^2$.

7. The device of claim 1, wherein each of said openings has a cross-sectional area of less than 0.10 cm$^2$.

8. The device of claim 1, wherein each of said openings has a cross-sectional area of less than 0.08 cm$^2$.

9. The device of claim 1, further comprising:
   (d) at least one discharge opening disposed in said housing, for discharging said de-aerated paste into an explosive device.

10. The device of claim 9, further comprising:
    (e) an interface assembly, connected to said housing and for connecting to a loading apparatus, said loading apparatus for containing said explosive device.

11. The device of claim 1, further comprising:
    (d) a loading apparatus designed and configured to have a chargeless shaped-charge munition loaded therein, and
    (e) a second chamber associated with said housing, for receiving said deaerated paste from said first chamber, said second chamber for fluid communication, via a paste discharge opening, with said shaped-charge munition.

12. The device of claim 11, further comprising:
    (f) a second piston, disposed within said second chamber, for injecting said de-aerated paste from said second chamber into said shaped-charge munition.

13. The device of claim 11, wherein said loading apparatus includes:
    (i) a vacuum aperture, disposed in said housing, for operatively connecting to a vacuum system for de-aeration of said paste streams during loading of said paste into said shaped-charge munition.

14. A device for de-aerating a highly-filled, high-viscosity paste, the device comprising:
    (a) a housing having:
       (i) a chamber, said chamber having a feed opening for receiving a highly-filled paste having a viscosity exceeding 100 kilopascal·seconds; and
       (ii) a piston for urging the paste within a specified path within said chamber;
    (b) a splitting element disposed within said path of said piston, such that said urging by said piston in a presence of said splitting element effects a splitting of said highly-filled paste into a plurality of paste streams, so as to increase a surface area of the high-viscosity paste by a factor of at least 200;
    (c) a vacuum aperture fluidly associated with said housing, for operatively connecting to a vacuum system for de-aeration of said paste streams, so as to produce a de-aerated paste;
    (d) a loading apparatus designed and configured to have a chargeless hollow-charge munition loaded therein;
    (e) a second chamber associated with said housing, for receiving said deaerated paste from said first chamber, said second chamber for fluid communication, via a paste discharge opening, with said hollow-charge munition; and
    (f) a holding mechanism, associated with said loading apparatus, for securely fixing in place a wave shaper of said hollow-charge munition.

15. A device for de-aerating a highly-filled, high-viscosity paste, the device comprising:
    (a) a housing having:
       (i) a chamber, said chamber having a feed opening for receiving a highly-filled paste having a viscosity exceeding 100 kilopascal·seconds; and
       (ii) a piston for urging the paste within a specified path within said chamber;
    (b) a splitting element disposed within said path of said piston, such that said urging by said piston in a presence of said splitting element effects a splitting of said highly-filled paste into a plurality of paste streams, so as to increase a surface area of the high-viscosity paste by a factor of at least 200;
    (c) a vacuum aperture fluidly associated with said housing, for operatively connecting to a vacuum system for de-aeration of said paste streams, so as to produce a de-aerated paste;
    (d) a loading apparatus designed and configured to have a chargeless shaped-charge munition loaded therein, and including a supporting element for supporting a liner in said munition, said supporting element designed to support said liner against a pressure of at least 20 atmospheres; and
    (e) a second chamber associated with said housing, for receiving said deaerated paste from said first chamber, said second chamber for fluid communication, via a paste discharge opening, with said shaped-charge munition.

16. The device of claim 14, further comprising:
(g) a protective cover for shielding said holding mechanism during a high-pressure injection of said de-aerated paste into said hollow-charge munition.

17. The device of claim 15, wherein said liner has a substantially conical contour, and wherein said a contour of said supporting element substantially matches said contour of said liner.

18. The device of claim 14, wherein said holding mechanism includes at least one threaded bolt for attaching said loading apparatus to said wave shaper.

* * * * *